(12) United States Patent
Sears et al.

(10) Patent No.: US 12,445,383 B2
(45) Date of Patent: Oct. 14, 2025

(54) EFFICIENT CONGESTION CONTROL IN A TUNNELED NETWORK

(71) Applicant: Akamai Technologies, Inc., Cambridge, MA (US)

(72) Inventors: William R. Sears, Lexington, MA (US); Martin K. Lohner, Medford, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 18 days.

(21) Appl. No.: 18/385,776

(22) Filed: Oct. 31, 2023

(65) Prior Publication Data

US 2024/0064104 A1 Feb. 22, 2024

Related U.S. Application Data

(63) Continuation of application No. 17/233,742, filed on Apr. 19, 2021, now Pat. No. 11,805,061, which is a continuation of application No. 16/365,502, filed on Mar. 26, 2019, now Pat. No. 10,986,027.

(60) Provisional application No. 62/648,470, filed on Mar. 27, 2018.

(51) Int. Cl.
*H04L 47/24* (2022.01)
*H04L 12/46* (2006.01)
*H04L 47/125* (2022.01)

(52) U.S. Cl.
CPC ............ *H04L 47/24* (2013.01); *H04L 47/125* (2013.01); *H04L 12/4633* (2013.01)

(58) Field of Classification Search
CPC . H04L 12/4641; H04L 47/24; H04L 12/4625; H04L 47/125; H04L 47/263; H04L 12/4633; Y02D 30/50
See application file for complete search history.

(56) References Cited

U.S. PATENT DOCUMENTS

| | | | |
|---|---|---|---|
| 2007/0153782 A1* | 7/2007 | Fletcher | H04L 61/4511 370/466 |
| 2013/0215750 A1* | 8/2013 | Beecroft | H04L 47/193 370/235 |
| 2014/0164641 A1* | 6/2014 | Ye | H04L 47/127 709/235 |
| 2014/0351638 A1* | 11/2014 | Chang | H04L 1/0015 714/18 |
| 2017/0099231 A1* | 4/2017 | Li | H04L 43/0888 |

* cited by examiner

*Primary Examiner* — Ji-Hae Yea
(74) *Attorney, Agent, or Firm* — David H. Judson

(57) ABSTRACT

A method of congestion control implemented by a sender over a network link that includes a router having a queue. During a first state, information is received from a receiver. The information comprises an estimated maximum bandwidth for the link, a one-way transit time for traffic over the link, and an indication whether the network link is congested. In response to the link being congested, the sender transitions to a second state. While in the second state, a sending rate of packets in reduced, in part to attempt to drain the queue of data packets contributed by the sender. The sender transitions to a third state when the sender estimates that the queue has been drained of the data packets contributed. During the third state, the sending rate is increased until either the sender transitions back to the first state, or receives a new indication that the link is congested.

11 Claims, 5 Drawing Sheets

EFFICIENT CONGESTION CONTROL IN A TUNNELED NETWORK

BACKGROUND

Technical Field

This application relates generally to overlay network routing over the publicly-routed Internet.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

As an overlay, the CDN resources such as described above also may be used to facilitate wide area network (WAN) acceleration services between enterprise data centers (which may be privately-managed) and third party software-as-a-service (SaaS) providers. Historically, packets are communicated across the network using conventional Transport Control Protocol (TCP) mechanisms. Typically, TCP uses loss-based congestion control, and each TCP connection within the overlay will respond to loss events. This type of congestion control can be inefficient when implemented in the context of an overlay network.

The is a need in the art to provide alternate techniques to loss-based congestion control, especially within the context of an overlay network.

BRIEF SUMMARY

A method of congestion control over a network link that includes a router having a queue. In one embodiment, the method is carried out at a sending entity that operates a state machine comprising a set of operating states. During a first state (an "unconstrained" state), a set of information is received from a receiving entity. The set of information comprises an estimated maximum bandwidth for the network link, a one-way transit time for traffic over the network link, and an indication whether the network link is congested. In response to the indication that the network link is congested, the sending entity transitions from the first state, to a second state (a "draining" state). While in the second state, a sending rate of packets is reduced, at least in part to attempt to drain the queue of data packets contributed by the sending entity. The sending entity transitions from the second state to a third state (a "probing" state) when the sending entity estimates that the queue has been drained of the data packets contributed. When in the third state, the sending rate is increased until either the sending entity transitions back to the first state, or a new indication that the network link is congested is received.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
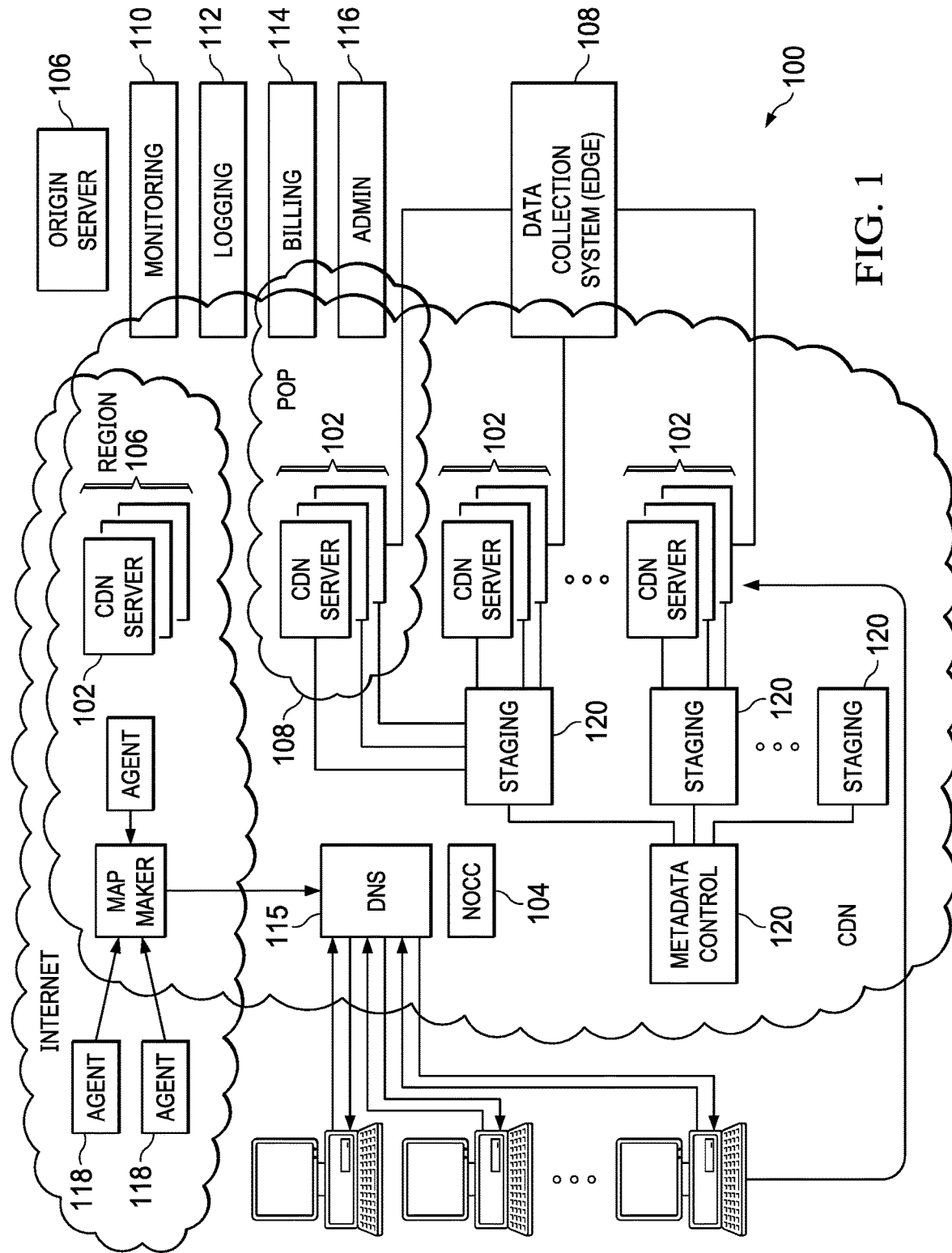
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102*a-n* distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or subdomains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
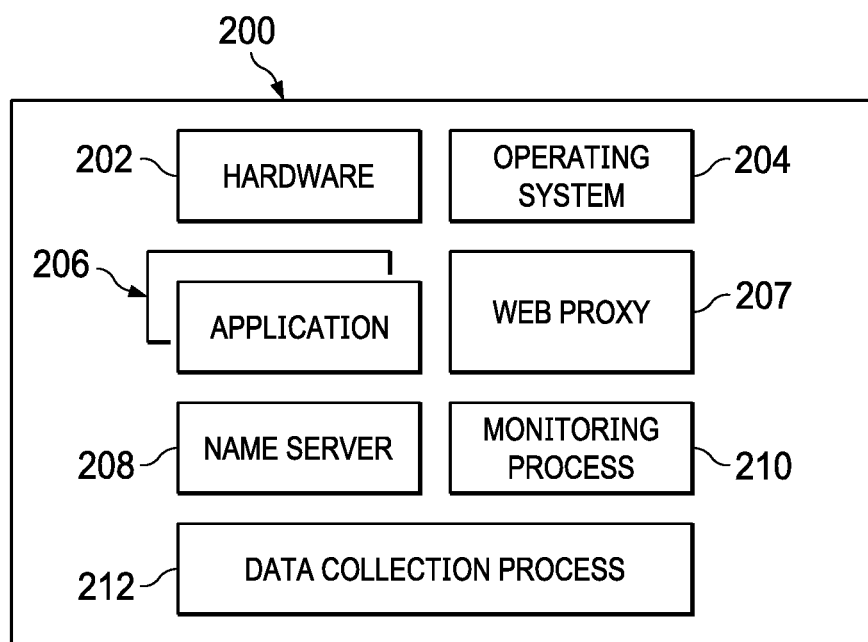
FIG. 2 is a representative CDN edge machine configuration.

As illustrated in FIG. 2, a given machine 200 in the content delivery network comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine may include one or more media servers, such as a Windows Media Server (WMS) or Flash server, as required by the supported media formats, or it may utilize HTTP-based delivery of chunked content fragments that constitute a stream.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

By way of further background, CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud. To accomplish these two use cases, CDN software may execute on virtual machines hosted in one or more customer data centers, and on virtual machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the service provider's other infrastructure (e.g., network and operations facilities). This type of managed solution provides an enterprise with the opportunity to take advantage of CDN technologies with respect to their Company's intranet.

As an overlay, the CDN resources such as described above also may be used to facilitate wide area network (WAN) acceleration services between enterprise data centers (which may be privately-managed) and third party software-as-a-service (SaaS) providers. The following provides additional details regarding this type of solution.

Figure 3:
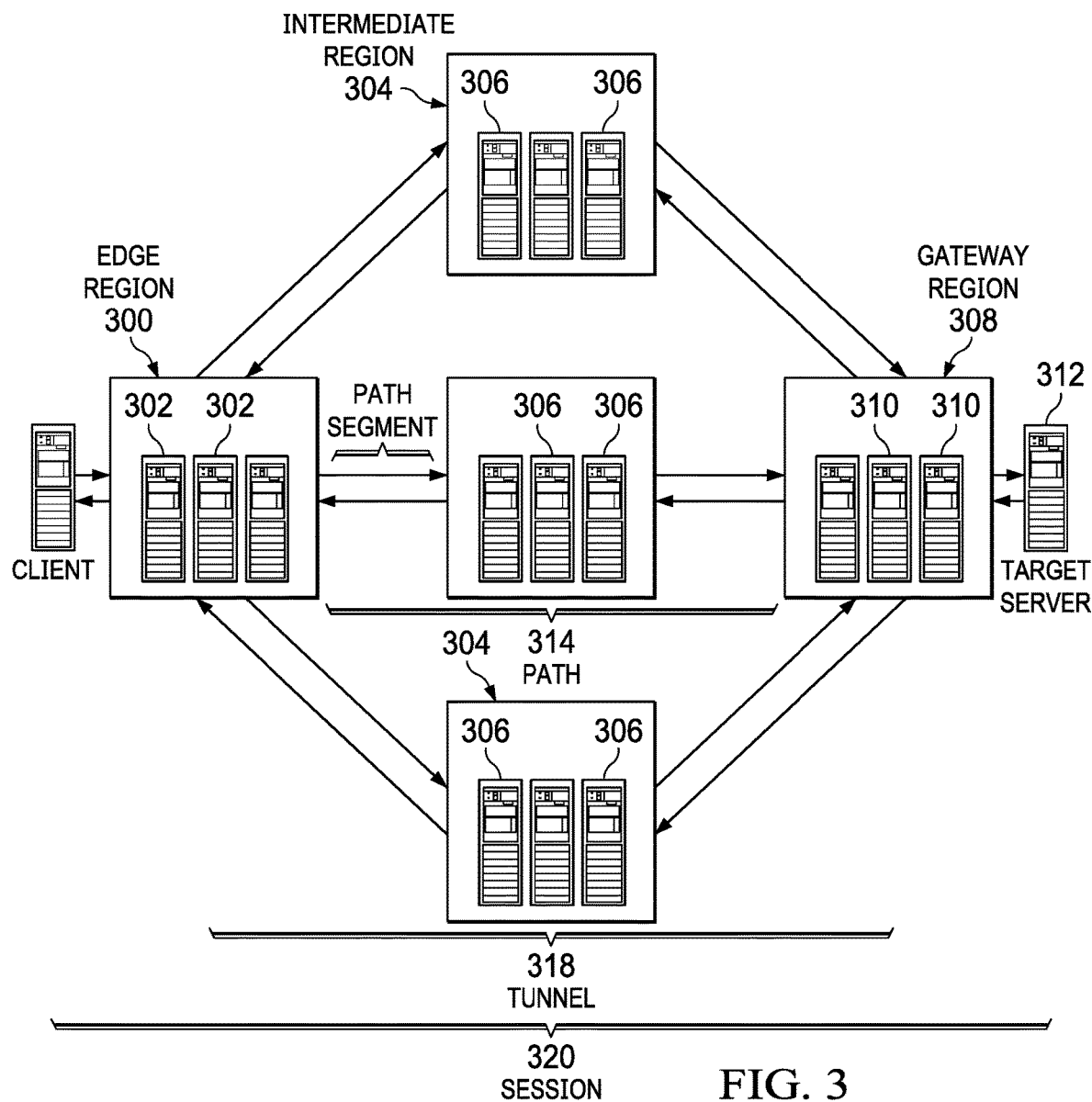
FIG. 3 illustrates a known "overlay" network solution whereby an "overlay" is positioned on top of the publicly-routable Internet.

In particular, FIG. 3 illustrates a known "overlay" network solution whereby an "overlay" is positioned on top of the publicly-routable Internet. This architecture is sometimes referred to as a "routing overlay" or "routing overlay network." The routing overlay network may leverage existing content delivery network (CDN) infrastructure, such as the infrastructure shown in FIGS. 1-2 above, and as provided by commercial services providers such as Akamai Technologies, Inc. of Cambridge, Massachusetts. An overlay network of this type provides significant performance enhancements for any application that uses Internet Protocol (IP) as a transport protocol by routing around down links or finding a path with a smallest latency. As is well known, the Internet Protocol (IP) works by exchanging groups of information called packets, which are short sequences of bytes comprising a header and a body. The header describes a packet's destination; Internet routers use the information to pass the packet along until it arrives at its final destination. The body contains the application data. Typically, IP packets travel over Transmission Control Protocol (TCP), which provides reliable in-order delivery of a stream of bytes. TCP rearranges out-of-order packets, minimizes network congestion, and re-transmits discarded packets.

Many of the machines in the overlay are servers located near the edge of the Internet, i.e., at or adjacent end user access networks. As has been described above, e.g., FIG. 1, third party web sites and application providers offload delivery of content and applications to the network, which operates as a managed service. The overlay network includes distributed infrastructure for data collection, monitoring, logging, alerts, billing, management and other operational and administrative functions. As has been described and as shown in FIG. 2, a typical CDN machine comprises commodity hardware (e.g., an Intel® Pentium® processor) running an operating system kernel (such as Linux™ or variant) that supports one or more applications. To facilitate content delivery services, for example, given machines typically run a set of applications, such as an HTTP Web proxy, a name server, a local monitoring process, and one or more data collection processes. The Web proxy includes or has associated therewith an edge server manager process to facilitate one or more functions associated with the content delivery network.

A known OIP (Overlay Internet Protocol) routing mechanism comprises a representative set of components, as illustrated in FIG. 3:

- edge server 302—typically, a CDN edge server running an OIP edge server software process (oidp) as described below. As will be described, this software is responsible for receiving, encapsulating and forwarding IP packets.
- edge region 300—typically, a CDN edge region configured for the overlay mechanism.
- intermediate server 306—typically, a server that receives encapsulated packets from an edge region 300 or other intermediate servers and forwards them on to other intermediate servers or to a gateway region.
- intermediate region 304—a region of intermediate servers.
- gateway server 310—typically, an edge server that has been configured to receive encapsulated packets from the overlay, and that applies source network address translation (NAT) to the original packets and forwards them onto the target server.
- gateway region 308—typically, a type of edge region comprising gateway servers and that is usually deployed on customer premises.
- Target server 312—a machine whose traffic is to be tunneled through the overlay.
- target address—the IP address of the target server; this address is sometimes referred to as a direct address when being compared to a CDN virtual IP address.
- slot—a single "instance" of the overlay; preferably, a slot is a numbered index that corresponds to a single target address.
- virtual IP address—typically, a CDN address that corresponds to a slot; preferably, there is one virtual IP address per edge region per slot. It is sometimes referred to as a VIP.
- path 314—an ordered set of CDN regions between an edge region and a gateway region.
- path Segment 316—a single hop of a path.
- tunnel 318—a set of one or more paths from an edge server to a gateway server.
- session 320—A single end-to-end connection from the client 322 to the target server; preferably, the session is defined by a five tuple (IP payload protocol, source address, destination address, source port, destination port). The source is the client and the destination is the target.

Figure 4:
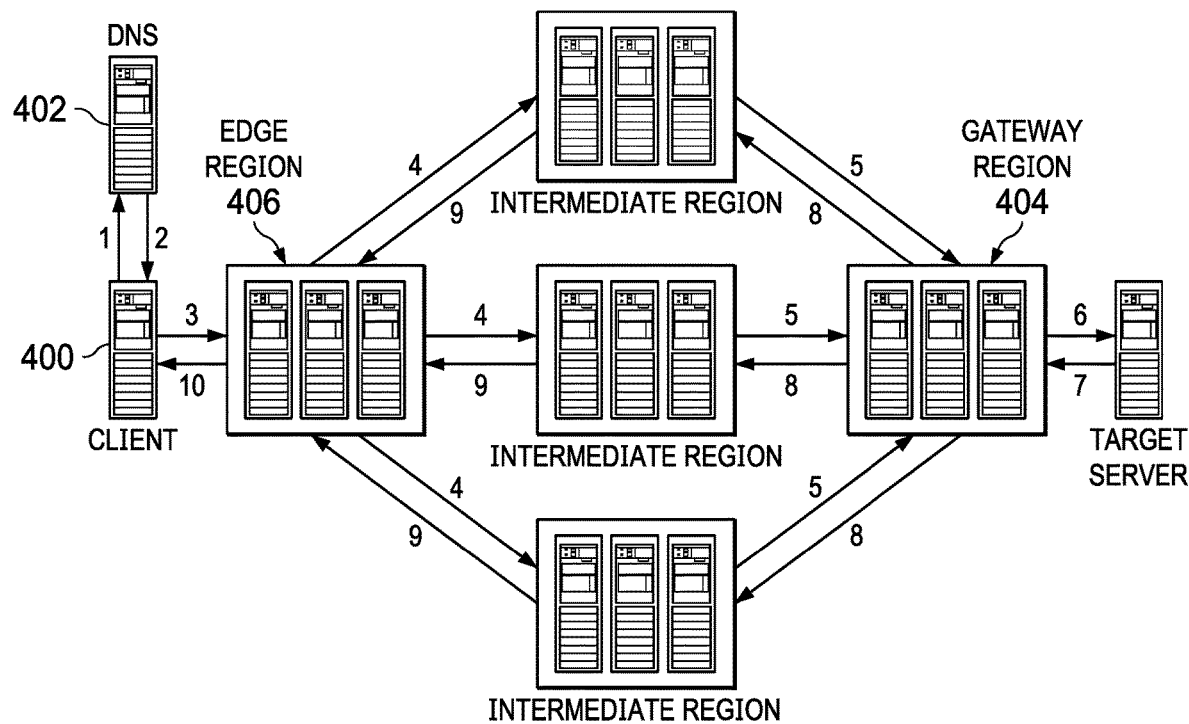
FIG. 4 depicts a use case in which an edge server in an overlay network edge region sends out multiple copies of encapsulated packets along multiple paths to facilitate an interaction between a requesting client and a target server.

In one known use scenario of the overlay network, one or more clients desire to send packets to a single IP address. This is illustrated in FIG. 4 and is now described. At step 1, the client 400 makes a DNS request to resolve a hostname, typically a hostname associated with a web-accessible application. This hostname is aliased (e.g., by a CNAME) to a domain that is being managed by an authoritative DNS 402; typically, the authoritative DNS is managed by the CDN service provider. Preferably, this hostname corresponds to a single gateway region (and target address) 404. This is also referred to as a slot, as described above. At step 2, the DNS query returns a single IP address for the hostname. This address identifies a best performing available edge region 406 and, preferably, that region is dedicated to the hostname. The address is referred to as a virtual IP address, as described above. At step 3, the client 400 begins to send IP packets to the virtual IP address. These packets are received by a server in the edge region 406. The edge region 406 knows the gateway region 404 to which to send the packets based on the destination address in the IP packet header. The packet is then encapsulated. At step 4, and based on routes preferably provided by a CDN mapping system, the edge server in the edge region 406 sends out multiple copies of the encapsulated packets along multiple paths. One technique for performing this multiple path packet transport operation is described in U.S. Pat. Nos. 6,665,726 and 6,751,673, assigned to Akamai Technologies, Inc. As illustrated at step 5, several intermediate servers receive the encapsulated packets and forward them (either directly, or through other Intermediate Regions, not shown) to the gateway region 404, once again, preferably based on routes provided from the CDN mapping system. At step 6, the packets are received by a server in the gateway region 404, where duplicates are removed. Destination NAT translates the virtual IP to the target address and source Network Address Port Translation is applied to the packet before it is sent, so that the return traffic will also be sent over the overlay network. Preferably, information is stored so that return traffic is sent to the edge region 406 from which the client packet originated. At step 7, the gateway region 404 receives an IP packet from the target address and de-NATs the packet. The packet is then encapsulated. At step 8, multiple copies of the packet are sent along multiple paths. At step 9, the intermediate servers send the packets back to the original edge region for this session. At step 10, the packets are received by an edge server and duplicates are removed. The packet is sourced from the virtual IP address and then sent back to the edge region.

The various connections used in the overlay network and as described typically are secured via SSL or other transport layer security (TLS) techniques.

A virtual private network (VPN)-as-a-service (or more generally, "network-as-a-service") can be facilitated using an overlay IP (OIP) routing mechanism such as shown in FIG. 3. The notion of networking "as a service" enables enterprises to effectively utilize Internet links as an optimized wide area network (WAN), connecting branches, data centers, teleworkers and mobile users to applications over the Internet. Driven by the impact of cloud computing and mobility, enterprises need a network service that can deliver an optimal and predictable cloud experience to users, preferably a network that is low-cost, easy-on, and global with security and optimization built-in.

Figure 5:
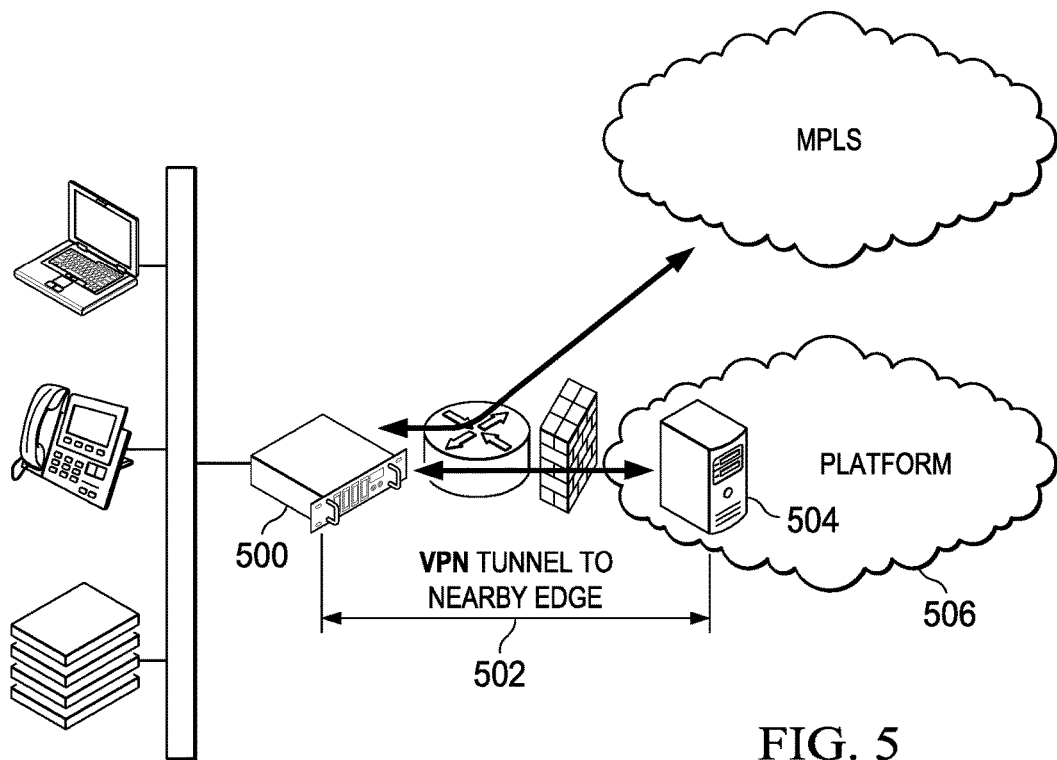
FIG. 5 illustrates how an overlay network appliance at one endpoint establishes a secure logical VPN tunnel to a nearby edge region or regions of the overlay network.

FIG. 5 illustrates how an overlay network appliance 500 at one endpoint establishes a secure logical VPN tunnel 502 to a nearby edge region or regions 504 of the overlay network 506. In this context, the network appliance 500 typically provides IPSec-based authentication and flow-based encryption, and the secure logical VPN tunnel 502 may incorporate one or more encrypted flows. Preferably, the edge 504 uses communications (e.g. keep-alive signaling) to maintain the tunnel through the enterprise firewall 508. When the overlay network customer desires to connect its local (inside the firewall) network, it can use the Internet-based overlay by having the appliances positioned at or adjacent to each endpoint when the local network connects to the Internet.

A description of this network-as-a-service approach is provided in U.S. Publication No. 2015/0188943.

An enhanced overlay network-based transport of traffic, such as IPsec traffic, e.g., to and from customer branch office locations, facilitated through the use of the Internet-based overlay routing infrastructure is described in U.S. Publication Nos. 2017/0195161, 2017/0195217 and 2017/0195237. The approach there describes, among other things, a method of managing and enforcing quality-of-service (QoS) in an Internet-based overlay network shared by a set of content provider customer entities. For each entity having a customer branch, the customer branch is coupled to the Internet-based overlay routing network. A quality-of-service (QoS) policy is configured for the customer. According to the method, utilization of the Internet-based overlay network against the configured QoS policy is then monitored. The QoS is then enforced for the customer and at least one other customer, based in part on the QoS policies. Capacity preferably is enforced for a customer entity according to the QoS policy at one of: a global level, a geographical region level, and at the customer branch level.

With the above as background, the techniques herein provide for enhanced overlay network-based transport of traffic, such as IPsec traffic, e.g., to and from customer branch office locations, facilitated through the use of the Internet-based overlay routing infrastructure (OIN) described above.

Loss-Based Congestion Control

Figure 6:
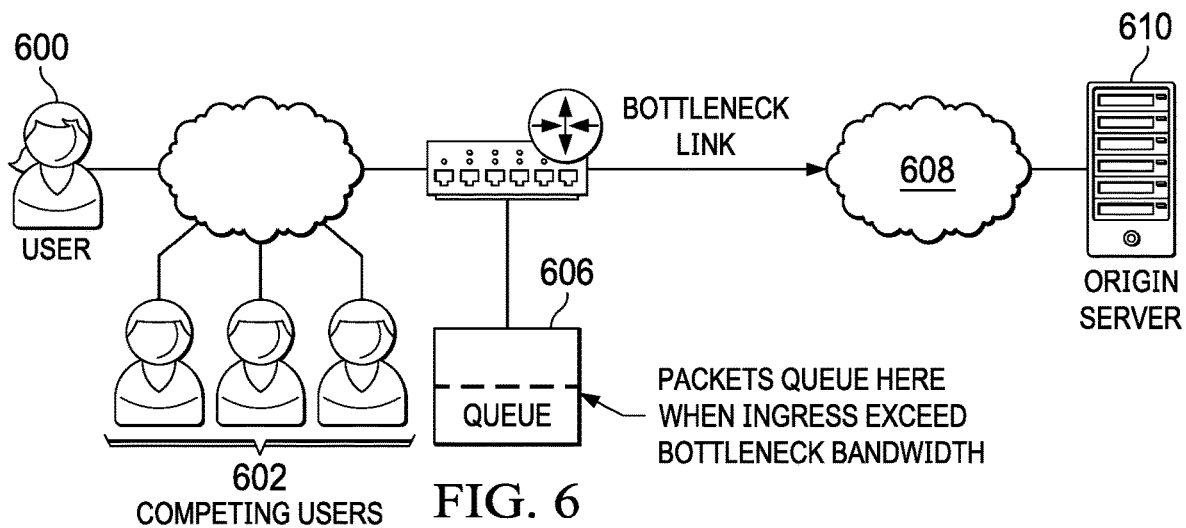
FIG. 6 depicts a model of a typical congested link in an overlay network operating environment such as described above.

Historically, TCP has used loss-based congestion control, and each TCP connection within the overlay will respond to loss events. There are several problems with this approach. To understand why this is the case, FIG. 6 depicts a model of a typical congested link. As depicted, the elements of the model are the user 600, other users 602 who may be sharing bandwidth on the network, a router 604 with a queue 606, a bottleneck link (this is the link that has the smallest bandwidth of any link on the path) 608, and an origin server 610. Given this model, the main characteristics of the connection are the bandwidth, which is controlled by the bottleneck link, and the Round Trip Time (RTT), which is the sum of the network transit time, and any queueing delays. Although the bottleneck link can move due to the dynamics of the network, at any given time there is normally only be one such link. In this common case TCP normally uses loss information to pace traffic at a rate consistent with the network's capacity.

In particular, a loss-based congestion control works by effectively monitoring the length of the queue at the router that is feeding the bottleneck link. Some routers perform Random Early Drop (RED) to signal congestion, while other simply drop packets when the queue is full. Controlling the congestion window allows the user agent to avoid sending more packets into the system than can be carried either as packets in transit or in the router queue. Because the congestion window is controlled by returning acknowledgements (ACKs), the user agent avoids sending packets at a rate higher than can be handled by the network under normal conditions.

When there is only one user, the user agent will grow the initial congestion window (CWND) exponentially until loss is first experienced. This loss signals that an excess of packets has been sent into the system. The normal behavior at this point is to reduce the window to half of the congestion value, and thereafter grow the window at a rate of one packet per round-trip time. This allows probing of the network until the queue fills again, at which point the window is reduced by half and is grown again (other congestion algorithms handle this a bit less dramatically, but the general effect is similar). If the maximum queue length at the bottleneck-link router is larger than the number of packets in flight on the wire, then CWND will vary from a full queue to a less full queue, and traffic will continue to flow at a more-or-less constant rate with occasional losses. The apparent RTT as seen by the user-agent will vary with the length of the queue. Because TCP transmissions are controlled by the combination of the CWND value and the rate of returning ACKs, throughput is close to optimal in this case, though there will be occasional loss and varying RTT.

If the maximum queue length at the bottleneck-link router is smaller than the number of packets in flight on the wire, a loss event will reduce CWND to a value below that required to maintain maximum throughput and performance is reduced. Because the queue is smaller in this case, the variation in RTT also is smaller. Some congestion control algorithms attempt to reduce this impact by making smaller initial reductions in CWND.

The problem becomes more complicated when (as depicted) multiple users are sending traffic through the bottleneck link, which effectively reduces the available bandwidth for each user on this link. In particular, access by multiple users can cause a bottleneck link to show up in a place where previously there was no bottleneck. In most cases, however, there will still be only one bottleneck link (although an exception occurs when multiple bottlenecks show up in the life of a single packet transiting the network). One can analyze the behavior by observing that the influx of packets from various users can combine to fill the queue. At this point, some of those users experience loss and respond by reducing their CWND. Other users may not experience loss and continue with higher values of CWND, giving those connections higher throughput. The effect on connections typically is somewhat random.

With the above as background, this disclosure provides for an alternate way of managing traffic in the network that does not depend on loss. In contrast to other non-loss based congestion controls algorithms, and as will be seen, this algorithm preferably does not make use of delay information to determine the appropriate transmission rate.

The following describes the technique of this disclosure. Constrained Bandwidth and Queue Length Algorithm (CBQ)

As will be described, generally the Congestion Bandwidth and Queueing technique herein is based first on measuring the received bandwidth and comparing that to transmission bandwidth, and secondly, attempting to keep the in-transit queues as short as possible while supporting a transmission rate that is as high as possible while not taking more than a fair share of the bandwidth. As long as the received bandwidth is approximately the same as the transmitted bandwidth, the link is not congested and no special action is taken. If, however, the receive rate is lower than the transmission rate, the link is considered congested and the sender attempts to first drain intermediate queue(s), and then transmit at the measured receive rate. While in this state, the sender preferably also periodically probes to detect excess queued packets and additional available bandwidth.

Preferably, transmission rate is determined by the measured receive rate and controlled by keeping track of the number of packets that are in flight. The number of packets that should be in flight preferably is estimated by computing the measured receive rate time based on an adjusted RTT.

The adjusted RTT is the round trip time measured (from the sender), minus an estimated transmission time for the packets that are in the queues as a result of sending at a rate higher than the available receive rate. In one embodiment, the latter number can be calculated as:

number_of_packets_sent−(number_of_packets_received+number_of_packets_lost)

over some interval. To synchronize the measurement interval, the measured one-way transit time (note that this time might be negative, due to clock skew) is used. Preferably, intervals on roughly the period of one RTT are compared.

The technique also estimates the number of packets in the queue by comparing the minimum transit time observed compared to the current transit time. If this time is increasing, that is an indication of congestion, while if this number is declining, it is an indication that the link is becoming less congested. Using the adjusted RTT and the current receive rate, the number of packets that should be send per RTT is computed, and the sender attempts to send them as evenly as possible over the interval. Periodically, and while in congested mode, the sender probes for more bandwidth, and attempts to drain the queue(s) by either sending a few extra packets per RTT, or sending a few less packets.

As will be described, in one embodiment, the CBQ algorithm may have the following parameters: a boost rate, i.e., how much to increase a flow rate to probe for additional bandwidth, averaging parameters for bandwidth estimate, including moving average parameters and measurement time (expressed in RTT units), burst probe and RTT probe time parameters, and burst increase and RTT decrease parameters. The CBQ algorithm preferably makes accurate ingress-egress measurements because it has packet-send times associated with each packet. The send times can be used to correlate corresponding windows between the sender and the receiver. Using this scheme, the actual link capacity can be determined, as well as whether the size of the intermediate queue(s) are increasing or decreasing.

Generalizing, and according to the technique of this disclosure, a receiver records the receive rate and sends that back to the sender. The receiver compares the send rate based on timestamps in the packet to determine if the link is congested. If it is, the receiver indicates that to the sender. The timestamps are used to estimate the sending rate, which is then compared to the receiving rate. The link is noted as congested if loss has been noted. If a sender receives a receive rate that indicates congestion, it will reduce its send rate to the indicated value. When the link appears congested, the sender estimates the amount of data that it has contributed to one or more router queue(s) by comparing the amount of data that is currently outstanding and subtracting from that value the amount that it estimates should have been read using the reported receive rate. In that case, the sender attempts to drain that buffered data from the network by sending at a rate lower than the estimated receive rate. If the sender receives an indication that the link is not congested, it will probe for a higher send rate if data is available to send. The use of the highest received acknowledgement will account for any lost packets that would otherwise count as outstanding. The helps improve the accuracy of the queued data estimate. Because the congestion estimate is not based on loss, the sending entity can safely do exponential increases when probing for bandwidth safely. Decreases in the sending rate are set to actual measure receive rates.

The algorithm requests that the receiver measure the effective one-way transit bandwidth, from which one can determine the maximum usage rate for the sender that will avoid congestion. Sending at that rate avoids adding to congestion in the network, and protects the network against excessive ingress from the overlay servers. Using this technique leaves the system free to perform error corrections without endangering the network or having a negative impact on performance.

In the overlay network in which the technique of this disclosure preferably is implemented, typically the operating conditions are considered to be unconstrained, meaning that there is sufficient network bandwidth to meet need. In that case, there is no need to take any action with respect to congestion. If congestion is detected, e.g., by noting a discrepancy between the send and receive rates, according to this disclosure, the Constrained Bandwidth and Queue algorithm (CBQ) is initiated. As noted above, preferably this algorithm sets a target sending rate based on the rate of data measured by the receiver. That rate is adjusted either up or down depending on whether there is an estimate of contribution to the queue(s) in the network. Preferably, the receiver regularly sends feedback back to the sender, which includes the receiver rate, an indication as to whether the link is constrained, and the highest packet sequence number that has been received.

If measurements indicate that a peer sender has contributed to the queued packets, then preferably the send rate is reduced to drain those packets from the system (i.e., from the queue(s)). Once the packets have been drained, the peer transitions to a probe state that modestly increases the send rate until the bandwidth needs are satisfied or until increasing queue sizes are encountered. If increased queue sizes are encountered, the congestion control portion of the algorithm is again instituted.

Preferably, the number of bytes contributed to the network queueing is estimated by computing the number bytes between the last byte sent and the last byte that was acknowledged by the receiver. Then, that number is adjusted by estimating the number of bytes that were probably consumed by the receiver using the latest receive rate sent by the receiver. This adjust number is a good quality estimate of the contribution to the number of bytes that have been contributed to the network.

To control the queue size, preferably the sending rate is adjusted relative to the bandwidth delay product, preferably by using the bandwidth observed by the receiver multiplied by the full RTT (including queue times). Packets are normally sent as evenly as possible within an RTT period, by multiplying the RTT by the bandwidth to get a rate. When attempting to drain the queues, the estimate of the contribution to the queue size over an interval is used. To get a better transit time estimate, occasionally a few packets are sent at a lower than average rate for one RTT. If that does not show a reduction in RTT, the drained packets are restored into the system on a next iteration.

To probe for increased bandwidth, the algorithm increases the desired packets in flight by a burst factor, and checks on the results.

The following provides a more detailed description of a preferred operation of the algorithm involving a sender and a receiver. A sender is a process (e.g., a server) executing on a first machine, and a receiver is a process executing on a second machine. Representative machines, server processes, etc. were described above. In this approach, a process is implemented as a set of computer program instructions (program code) executed by a processor, typically hardware. The process may execute in association with an operating system kernel, but this is not a requirement.

The following describes a representative functionality.

1. The sender attaches to each packet a sequence number and a send times. The receiver calculates the sending rate based on the send times.
2. The receiver also calculates a relative one-way transit time.
3. The receiver calculates the receive rate relative to the send rate for the corresponding packets. Preferably, this is calculated over a small number of round-trip times, with the number of round-trip times being configurable. The send and receive periods preferably are aligned using the one-way transit times by keeping a queue of recently received packets. The queue records the number of bytes, the send and receive times, and the sequence number. Preferably, the send times are used to determine the sending rate, while the receive times are used to calculate the receive rate.
4. If the measured send rate over the interval is higher than the receive rate, then the link is noted as probably congested, and that the measurement is probably a good estimate of the current bandwidth. If the send and receive rates are approximately equal, the receive rate measurement is assumed to be an underestimate of the actual receive rate. In this case, the measurement preferably is used to increase the bandwidth estimate, but preferably not to reduce it.
5. If loss is detected by the receiver in the measurement window, the link is considered congested and the actual number of bytes received during the window is used to calculate the receive speed.
6. The receiver keeps track of recently lost packets. If all of the recent lost packets are subsequently received out of order and the send speed was not higher than the receive speed, the receive speed is adjusted to its previous value and reported as uncongested.
7. The congestion state so measured is sent back to the sender, along with bandwidth and timing information. The receiver preferably forwards the following information back to the sender:
    a. Estimated maximum bandwidth for the link (based on received packets)
    b. The one-way transit time,
    c. An indication as to whether the link appears to be congested based on the relative sending and receiving rates,
    d. The sequence number of the highest packet that has been received.

Figure 7:
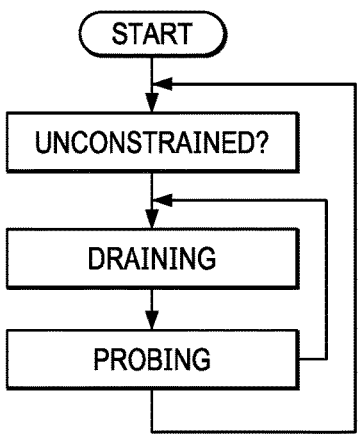
FIG. 7 depicts a state diagram depicting a set of state transitions that are implemented by a peer entity executing the congestion control technique of this disclosure.

Packets returned are treated as sender packets. In this manner, preferably the system is modeled as two unidirectional links. This provides transit and queue information in both directions to both sides of the link 8. When an ACK is received, the following updates are made, the state is updated. The state is one of the following, as depicted in FIG. 7:
    a. Unconstrained: this indicates that the receiver is receiving at the sender's send rate, so there are no observed constraints in the network. Congestion is not an issue (regardless of any loss).
    b. Draining: this indicates the receiver is receiving at a lower rate than the sender is sending. Accordingly, preferably the rate is reduced, and an attempt is made to drain any queues of any packets for which the entity is responsible. To enter this state, a feedback packet from the receiver indicating congestion should be received, as preferably the bandwidth estimate is only reduced when this indication is present.
    c. Probing: when it is estimated that the queues have been drained of the entity's contribution, preferably the sending rate is increased until congestion appears again. If a desired send rate based on available data to send is reached, an unconstrained state is entered.
9. Each sender keeps track of the number of packets in flight. The observed number is the difference between the last packet sent and the last packet acknowledged. The desired number is equal to the observed round trip time (both ways, including queuing delays) and the times the speed of the link (bandwidth delay product). This information controls the send rate. Normally, it is desired to send one bandwidth delay product of data per round-trip time, spreading the data out across the round-trip time as evenly as possible. Unlike TCP, preferably ACK packets are not used to pace transmissions.
10. If in the unconstrained state, the entity can simply send data at the preferred rate, watching the RTT to keep the number of packets in flight at the optimal level. Each sender keeps track of an estimate of the minimum RTT. Preferably, this estimate is computed by subtracting the estimated queuing delay in both directions from the measures RTT. The RTT is measured from the time a packet is sent until the time an ACK is received.
11. If in the constrained state, however, preferably the following is done:
    a. Estimate the target send rate based on the observed received rate, as sent from the receiver in a recent ACK packet.
    b. Estimate a contribution to the excess queuing delay. This is computed from our recent send rate, and the new observed capacity. Preferably, the number of bytes sent but not acknowledge minus the expected receive rate by the receiver becomes an estimate of the queue data contribution.
    c. Compute a compensation rate that will reduce the contribution to the queueing delay over the next RTT. Packets are then sent at that rate.
    d. When the network has been drained of the queued data, increase the sending rate geometrically (preferably slowly) to determine if more bandwidth is available.
12. In the congested state, observe the rates for some period. If it is stable, then go to the probing state.
13. In the probing state, increase the number of packets modestly until reaching an unconstrained state based on the number bytes available to send, or a congested state. Then, either enter the unconstrained state or the constrained state.

As depicted in the state diagram in FIG. 7, the state transitions are then defined as follows. In a start state, estimate the RTT and link speed based on history of links between those nodes. These are stored globally. The state transitions are described below and depicted in FIG. 7:

1. If the amount of traffic to send is consistent with recent experience with the link, enter the unconstrained state and start sending.
2. If congestion is experienced, enter the draining state to drain the associated queues of excess bytes.
3. Once the queues are drained, probe for additional bandwidth
4. If the probe results in an overrun, go back to the draining state
5. If the receive rate matches a desired send rate, go back to the unconstrained state Variants The CBQ algorithm as described herein may be extended to multiple paths as follows. The system keeps track of which path each packet uses for transit. Using this information, the system determines the bandwidth and delay for each path. By bursting the traffic through each link independently, the system attempts to fine a set of best or optimal parameters for each link. By sending bursts of traffic over two or more links, the system attempts to determine when multiple paths are effectively a single path (because they share a constrained link). By doing this with a burst of redundancy, the approach can be implemented with a low probability of impacting the traffic that is being sent.

In this embodiment, path information is added to the base information to allow determination of specific path bandwidth and delay, and preferably this information is transmitted on multiple (perhaps all) paths, and using a single packet. Using traffic bursting (e.g., on single and multiple paths), a determination is made whether paths contain a common constraining segment. Preferably, redundant bursting with extra repair packets is used to allow multiple path probing without impacting normal traffic.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

Preferably, the point of entry into the overlay network is through a VPN tunnel between a client machine and an overlay network edge region.

The techniques herein generally provide for the above-described improvements to a technology or technical field, as well as the specific technological improvements to various fields including distributed networking, Internet-based overlays, WAN-based networking, secure and efficient utilization of Internet links, and the like, all as described above.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Each above-described process preferably is implemented in computer software as a set of program instructions executable in one or more processors, as a special-purpose machine.

One or more functions herein described may be carried out as a "service." The service may be carried out as an adjunct or in association with some other services, such as by a CDN, a cloud provider, or some other such service provider.

What is claimed is as follows:

1. A method of congestion control over multiple paths of network links, comprising:
   for each data packet being delivered from a sender, maintaining an indication of which path of the multiple paths the data packet uses for transit;
   based on the indications, determining a bandwidth and delay for each path of the multiple paths;
   sending bursts of traffic over one or more of the multiple paths;
   responsive to the bursts of traffic, determining whether any of the multiple paths share a constrained network link; and
   upon determining that at least first and second of the multiple paths share a constrained network link, applying a congestion control algorithm to the constrained network link.

2. The method as described in claim 1 wherein the congestion control algorithm is a constrained bandwidth and queue (CBQ) algorithm.

3. The method as described in claim 2 wherein the CBQ algorithm sets a target sending rate of the sender over the constrained network link based on a rate of data measured by a receiver.

4. The method as described in claim 3 wherein the target sending rate is adjusted either up or down depending on a queue contribution estimate.

5. The method as described in claim 4 wherein the queue contribution estimate is a measure of an amount of data the sender has contributed to a queue that is used by a set of sender entities that include the sender.

6. The method as described in claim 5 further including controlling the sender to reduce its sending rate at least in part to attempt to drain the queue of data estimated to have been contributed by the sender.

7. The method as described in claim 5 wherein estimating the amount of data the sender has contributed to the queue compares an amount of data that is currently outstanding in the queue and subtracts from that value an amount of data that the sender estimates should have been read from the queue given the receive rate reported by the receiver.

8. The method as described in claim 1 wherein the sender is associated with an overlay network that uses the network links.

9. The method as described in claim 1 wherein the sender is associated with an edge server in the overlay network.

10. The method as described in claim 1 further including wherein the bursts of traffic include repair data packets.

11. The method as described in claim 1 wherein the bursts of traffic are sent without impairing transmission of data from the sender over the multiple paths.

* * * * *